April 8, 1958     E. L. MACKOR     2,830,105
EXTRACTION OF META DIALKYLBENZENES WITH HF-PF
Filed Feb. 27, 1956
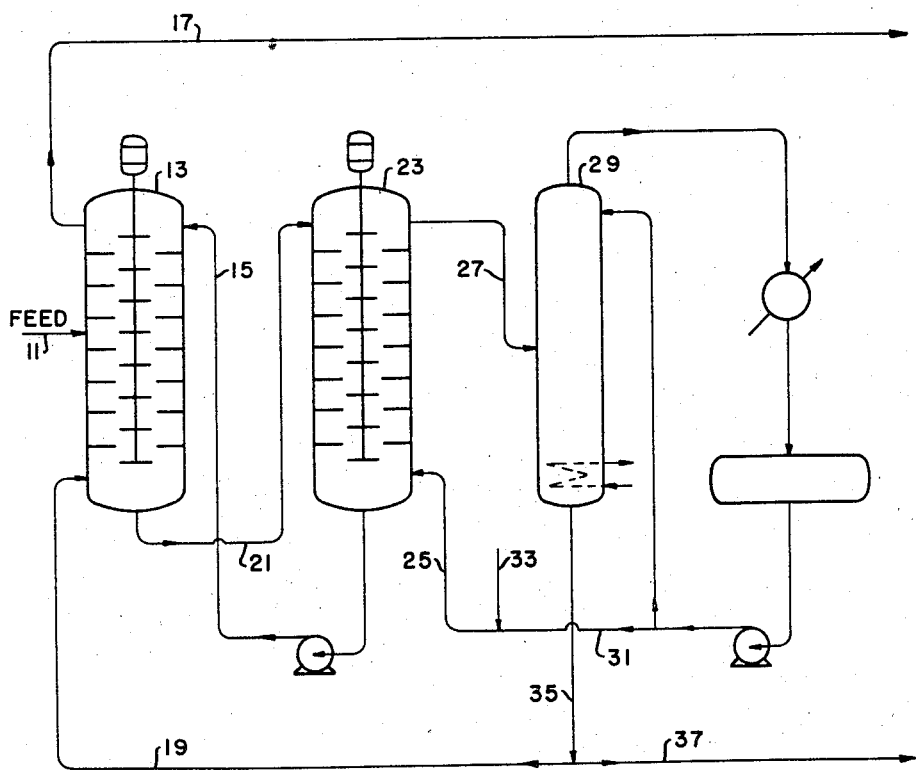
INVENTOR:
   EDUARD LOUIS MACKOR
BY: *James Todorvic*
      HIS ATTORNEY

United States Patent Office 2,830,105
Patented Apr. 8, 1958

2,830,105

EXTRACTION OF META DIALKYLBENZENES WITH HF—$PF_5$

Eduard Louis Mackor, Amsterdam, Netherlands, assignor to Shell Development Company, New York, N. Y., a corporation of Delaware Application February 27, 1956, Serial No. 567,844

Claims priority, application Netherlands March 25, 1955

6 Claims. (Cl. 260—674)

This invention relates to a method for the separation of mixtures of aromatic compounds, and more particularly pertains to the solvent separation of mixtures of aromatic hydrocarbons. More specifically, the invention is concerned with the separation and purification of meta-disubstituted benzene derivatives from a mixture thereof with other disubstituted benzene derivatives, monosubstituted benzene derivatives and/or unsubstituted benzene. In a more limited aspect, the invention is concerned with the separation and purification of dialkyl-substituted benzenes from mixtures thereof with isomeric benzenes having similar boiling points, such as may be represented by a crude xylene mixture which contains both meta-xylene and other xylenes and also ethylbenzene.

Mixtures of certain aromatic compounds, such as benzene, alkyl benzenes (toluene, xylenes, etc.), are produced as by-products from the coking of coal and also from certain petroleum conversion and separation processes. Various methods have been proposed for effecting at least partial separations as applied to such mixtures as indicated above. Where there is a sufficient difference in the boiling points of some of the constituents of the given mixtures, the separation is effected by fractional distillation. Thus, ortho-xylene (B. P., 144.4° C. at 1 atmosphere pressure) can be separated from a mixture containing it and the meta- and para-xylenes (boiling points, 139.3° C. and 138.5° C., respectively) by fractional distillation. However, the meta- and para-xylenes cannot be separated from each other by such a method.

Other methods heretofore proposed have not been entirely satisfactory for the separation and recovery of the meta-disubstituted benzene compounds from other aromatic substances normally admixed therewith and having similar boiling points. For example, it has been proposed to separate the meta-disubstituted compound by extraction with a mixture of boron fluoride and hydrogen fluoride and after separation of the two phases, recovering the meta-disubstituted compound from the hydrogen fluoride phase by decomposition of the complex formed with boron fluoride. Similar techniques have been proposed variously using titanium fluoride, columbium fluoride and tantalum fluoride. In all of these processes, however, the complex is very stable and its decomposition is difficult or impossible to achieve without at least some chemical reactions leading to isomerization of the organic component and a resulting loss in yield of the meta-disubstituted compound.

It is, therefore, a principal object of the present invention to provide an efficient and economical process for the separation of mixtures of substituted aromatic compounds into their constituent components. A further object is to provide a process for the separation and recovery, from mixtures of aromatic compounds, of fractions enriched in meta-disubstituted benzene compounds. A more specific object of the invention is to provide an improved process for the separation of meta-disubstituted benzene hydrocarbon compounds from isomeric mixtures thereof with other benzene compounds containing similar substituent groups, wherein the substituent groups are selected from alkyl groups, more particularly the lower alkyl groups such as those containing one, two and three carbon atoms, and especially such isomeric mixtures wherein the substituted benzene compounds contain up to 10 carbon atoms each. In a still more limited aspect, an object of the invention is to separate and purify meta-xylene from a crude mixture of xylenes, including ethyl benzene, and especially the separation of meta-xylene from a mixture consisting essentially of meta-xylene and para-xylene. Other objects will be apparent from the description of the invention.

The practice of the invention will be described with reference to the accompanying drawing, consisting of a single figure, which is a schematic diagram illustrating a preferred but not limiting embodiment of the invention.

It has now been discovered, in accordance with the present invention, that a meta-disubstituted benzene hydrocarbon compound is effectively and economically separated from a mixture thereof with other hydrocarbons by a process comprising contacting the mixture with phosphorus pentafluoride ($PF_5$) in the presence of liquid hydrogen fluoride (HF). The mixture of $PF_5$ and HF will hereinafter be termed the solvent mixture. It is found that the meta-disubstituted benzene dissolves in the hydrogen fluoride phase to form a complex of the meta-disubstituted isomer, phosphorus pentafluoride and hydrogen fluoride.

The remaining compounds, including the non-meta-substituted benzene compounds present chiefly remain behind in the oily phase. After separation of the two liquid phases the meta-disubstituted benzene is recovered from the hydrogen fluoride phase by decomposition of the complex formed. It is now found (and this is one of the special advantages of the invention), that the complex formed decomposes very readily, no chemical conversion of the meta-disubstituted isomer (e. g., isomerization) occurring. As the process is usually carried out at elevated pressure, a reduction in pressure effecting volatilization of the phosphorus pentafluoride is usually sufficient for this decomposition, with the meta-disubstituted benzene, which is only slightly soluble in liquid hydrogen fluoride in the absence of phosphorus pentafluoride, separating as a separate phase. Thus, large savings are realized over those processes in which it is necessary to heat a complex to decompose it and/or recycle a relatively large amount of the meta-disubstituted benzene with a solvent or complexing material.

The phosphorus pentafluoride and the hydrogen fluoride can be recycled either together or separately for contacting additional amounts of the mixture to be separated.

The amount of phosphorus pentafluoride dissolved in the hydrogen fluoride can vary within wide limits; the amount is usually 0.5 to 50 mol percent, calculated on the amount of solvent mixture, depending on the temperature and pressure used.

The solvent power is increased by carrying out the process under pressure, the partial pressure of the phosphorus pentafluoride being above the atmospheric pressure, or by reducing the temperature of the solution.

The temperature at which the complex is formed preferably lies between —50° C. and +50° C., more especially from about —20° C. to +20° C.

The partial pressure of the phosphorus pentafluoride during the contacting step is preferably maintained between 1 and approximately 100 atmospheres, preferably at least 10 atmospheres. The hydrogen fluoride and the phosphorus pentafluoride can be previously mixed together, or be added successively to the starting aromatic mixture; the aromatic mixture is preferably first mixed with hydrogen fluoride which is saturated at the operating pressure with phosphorus pentafluoride and additional phosphorus pentafluoride is then supplied to the resultant mixture.

The amount of solvent mixture is generally 0.5 to 100 times, or preferably 5 to 15 times, the amount of the aromatic mixture, depending on the conditions under which the treatment is carried out and the amount of meta-disubstituted isomer to be separated.

The complex is formed rapidly. Generally, contact of a few minutes to one-half hour is more than sufficient and this period can be considerably reduced by the use of a suitable apparatus, such as any of the more efficient countercurrent contacting columns, a rotating disk contactor, or the like.

The relatively heavy hydrogen fluoride phase containing the complex and any excess of solvent components may be separated in any suitable way from the relatively light oily phase containing isomers which have not formed any complex, e. g. by precipitation, decanting, centrifuging, or using a contact space with filling material (e. g. moistened with liquid hydrogen fluoride).

After separation of phases, the complex is decomposed by removing phosphorus pentafluoride from the hydrogen fluoride phase. This can be effected by reducing the pressure and/or increasing the temperature. As before mentioned, an advantageous way is to decompose the complex by releasing the pressure on the hydrogen fluoride phase, whereby the phosphorus pentafluoride is vaporized. When the process is conducted at temperatures generally lower than ambient, for example $-25°$ C. to $+15°$ C., in order to conduct the extraction step at a lower pressure, the complex can be decomposed easily by raising the temperature, but in no case is it necessary to raise the temperature to an extent that deleterious chemical reactions, such as isomerization, take place, or to an extent, for example, over $50°$ C., that substantial expenditure of heat is required. The complex can be also decomposed by a combination of pressure reduction and mild heating, depending upon economic considerations of the particular conditions involved. After pressure reduction and/or mild heating, any meta-disubstituted benzene remaining in the hydrogen fluoride phase can be recovered still more completely by extraction, for example, with a hydrocarbon fraction, preferably a paraffinic fraction, or a fraction boiling either above or below but not overlapping the boiling point of the meta-disubstituted benzene. The extracted meta-disubstituted benzene can be easily isolated from the hydrocarbon extract phase by simple distillation, in the case of the use of the latter type of fraction.

Another method of recovering the meta-disubstituted benzene from the complex, and one which is especially advantageous in a continuous countercurrent contacting embodiment of the invention, is contacting the extract phase from the aromatic mixture-solvent mixture contacting zone with a hydrocarbon fraction boiling either above or below but not overlapping the boiling point of the meta-disubstituted compound and without any substantial intervening change in pressure or temperature.

The decomposition of the complex can be promoted by adding to the hydrogen fluoride phase an auxiliary substance which is soluble therein and reduces the tendency of the meta-disubstituted isomer to form the complex. Suitable auxiliary substances are those substances which are more basic in liquid hydrogen fluoride than the meta-disubstituted benzene of the complex, e. g., water, various salts, both organic and inorganic, various oxygen-containing organic compounds such as alcohols, ethers, and the like. A preferred technique is to add a salt, for example, an alkali fluophosphate such as $NaPF_6$, or an alkali fluoride such as NaF which then forms the compound $NaPF_6$ with the phosphorus pentafluoride. Such a salt can be added to the complex after separation of the extract (HF) phase from the remainder of the aromatic compound mixture, or in some cases it will be advantageous to add the salt directly to the solvent solution either before or during the contacting step. In the latter case, the complex forming tendency of the solvent solution will be somewhat reduced but overall advantages are often obtained, especially when the meta-disubstituted benzene is recovered from the hydrogen fluoride phase by contacting with a hydrocarbon fraction having a boiling range not including the boiling point of the meta-disubstituted aromatic compound, as mentioned above.

The contacting of the original hydrocarbon mixture containing the meta-disubstituted benzene with the solvent mixture can be a batch process or a continuous process. The latter is preferred, particularly a countercurrent process, and an especially advantageous embodiment of the invention comprises backwashing the extract phase (containing the complex of the meta-disubstituted benzene) in such a continuous countercurrent extraction with an amount of the separated meta-disubstituted benzene itself, whereby the purity of the recovered meta-disubstituted benzene is increased. Of course, another advantage of backwashing is that it increases the yield of the non-meta-substituted benzene compounds and any non-aromatics present in the raffinate from the contacting step. The backwash technique is generally described in U. S. Patents 2,081,719 and 2,081,721.

If desired, the aromatic mixture may be mixed with an inert diluent such as a mixture of paraffin hydrocarbons (preferably boiling lower than that of the compounds to be separated). The amount of diluent to be used depends upon economic considerations and generally varies between one-fourth and ten times the volume of the isomer mixture.

Diluents for the solvent mixture may also be added and under some conditions favorably influence the extraction. Examples of suitable solvent mixture diluents are sulfur dioxide, carbon tetrachloride and carbon disulfide.

The amount of phosphorus pentafluoride used can vary within wide limits and can differ for different sections of the contact space, for example, by introducing the phosphorus pentafluoride at various stages of a continuous contacting countercurrent process. It is usually necessary to use at least a mol quantity which is equal to the mol quantity of meta-disubstituted isomer to be separated. This can easily be determined by experiment. In order to obtain a practically complete separation at least 1 mol of phosphorus pentafluoride should be used to 1 mol of meta-disubstituted isomer. The ratio of the quantity of phosphorus pentafluoride to the quantity of meta-disubstituted isomer can, however, be considerably greater than that corresponding to the molar ratio 1:1.

The process of the invention is useful for the separation of various mixtures of hydrocarbons, at least one of the compounds of the mixture being a meta-dialkyl-substituted benzene hydrocarbon, that is, a benzene derivative containing at least two nuclear alkyl substituents on nuclear carbon atoms which are each adjacent to the same unsubstituted nuclear carbon atom. It will be understood that such mixtures may also contain other aromatic hydrocarbons or derivatives thereof, and the invention is of particular utility where the mixture contains such other aromatic compounds having similar boiling points to those of the meta-disubstituted benzene compound. Thus, meta-xylene may be separated from ethyl benzene in accordance with the present invention. An important mixture of aromatic compounds which is separated by the process of the invention is a mixture of meta-xylene and other xylenes, which may or may not contain an appreciable amount of ethyl benzene. The invention finds useful application particularly in the separation and recovery of meta-xylene from a mixture thereof with para-xylene, and possibly ethyl benzene, as is generally obtained from a xylene cut of petroleum hydrocarbons, especially an aromatic extract thereof, after separating the ortho-xylene from the other xylenes by fractional distillation.

Other mixtures which can be suitably separated by the process of the invention are isomeric mixtures of the $C_9$ alkylbenzenes, and isomeric mixtures of $C_{10}$ alkylbenzenes. Such mixtures, of course, as contrasted to the $C_8$ alkylbenzenes, may each contain more than one meta-disubstituted benzene and, in the separation thereof by the process of the invention, the extract phase obtained when such mixtures are contacted with the solvent solution usually is enriched in all such meta-disubstituted benzenes. For example, in the case of a $C_9$ alkylbenzene isomeric mixture the extract phase is enriched in the meta-disubstituted isomers, mesitylene, pesudocumene and 1-methyl-3-ethylbenzene, while the raffinate is enriched in the non-meta-disubstituted isomers, hemimeltitene, cumene, etc. The ratio of the amount of phosphorus pentafluoride present (in the usual case of an excess of hydrogen fluoride) in proportion to the amount of the meta-disubstituted isomers present will of course determine the relative amounts of such meta-disubstituted isomers which will form complexes; the order of complex preference is first mesitylene, second pseudocumene, and last 1-methyl-3-ethyl benzene. Similar considerations are involved in the case of separating $C_{10}$ alkylbenzene isomeric mixtures, which contain, for example, the meta-disubstituted isomers, durene and isodurene and the non-meta-disubstituted isomer, prehnitene.

The present invention is especially advantageous in the separation of isomeric mixtures of $C_8$ to $C_{10}$ alkylbenzenes wherein the alkyl groups contain from 1 to 2 carbon atoms each, and preferably wherein the alkyl groups are all methyl groups. Thus, the preferred class of isomeric mixtures is a mixture of isomeric polymethylbenzenes containing from 2 to 4 methyl groups and having the formula $C_6H_{6-n}(CH_3)_n$, where $n$ is an integral number from 2 to 4, inclusive, which mixture containes at least one meta-dimethyl benzene.

The aromatic starting mixture to which the process of the invention is applied must be essentially free of organic sulfur, that is, it must contain less than about 0.05 or 0.10 percent by weight total sulfur. This is to prevent an excessive build-up of sulfur in the solvent solution, since organic sulfur complexes which might be formed are generally not decomposed under the mild conditions used for the decomposition of the meta-disubstituted aromatic complex.

The invention will be further illustrated by the following examples.

*Example I*

Approximately 94.2 mols of an essentially sulfur-free mixture containing 50% by weight of meta-xylene and 50% by weight of para-xylene was mixed in a stirred pressure vessel with approximately 5,000 mols of hydrogen fluoride. The temperature was adjusted to 0° C. and phosphorus pentafluoride was introduced into the vessel, under pressure while stirring, until a pressure of 20 atmospheres was reached, at which time approximately 430 mols had been added. The mixture was then allowed to settle for half an hour, two liquid phases being formed, a top phase with the para-xylene and some unreacted meta-xylene, and a bottom phase containing the liquid hydrogen fluoride and the meta-xylene complex. The two phases were separated and the para- and meta-xylene obtained from each phase separated.

The top phase (A) contained 31.0 mols of xylene consisting of 5.5% by weight meta-xylene and 94.5% by weight para-xylene. The pressure on the bottom phase was now released to 1.5 atmospheres and the gaseous phosphorus pentafluoride, in which a small amount of hydrogen fluoride was entrained, was collected. During release of the pressure the hydrogen fluoride phase slightly demixed. As top phase (B) thereof 15.1 mols of xylene was separated, consisting of 47.0% by weight of meta-xylene and 53.0% by weight of para-xylene. The bottom phase thereof was treated with 16 kilograms of a light hydrocarbon mixture (boiling point 40–60° C.) and after a short period of stirring and settling 19.3 kilograms of hydrocarbon phase (C) was separated from the hydrogen fluoride phase. 31.2 mols of xylene was obtained from the separated hydrocarbon phase by distillation, the xylene consisting of 70.9% by weight of meta-xylene and 29.1% by weight of para-xylene. The remaining hydrogen fluoride phase (D) contained 16.9 mols of xylene consisting of 94.4% by weight meta-xylene and 5.6% by weight of para-xylene.

*Example II*

Approximately 94.2 mols of an essentially sulfur-free mixture containing 50% by weight meta-xylene and 50% by weight of para-xylene was mixed in a stirred pressure vessel with approximately 5,000 mols of hydrogen fluoride in which 50.6 mols of the salt $NaPF_6$ was dissolved. The temperature was adjusted to 0° C. and phosphorus pentafluoride was forced into the vessel, while stirring, until a pressure of 20 atmospheres was reached, at which time approximately 430 mols had been supplied. The mixture was then allowed to settle for half an hour, two liquid phases being formed which were separated and worked up as in Example I.

The yields were as follows:

|  | Total Xylene, Mols | Meta-xylene, Percent by weight | Para-xylene, Percent by weight |
|---|---|---|---|
| Top Phase (A) | 33.8 | 10.0 | 90.0 |
| Bottom Phase: |  |  |  |
| Top phase (B) of the hydrogen fluoride phase | 25.7 | 60.0 | 40.0 |
| Hydrocarbon phase (C) | 28.5 | 80.4 | 19.6 |
| Remaining hydrogen fluoride phase (D) | 6.2 | 87.9 | 12.1 |

*Example III*

Referring now to the drawing, which is a simplified flow scheme of a preferred embodiment of the invention, the feed consists of an essentially sulfur-free mixture of $C_8$ aromatics, with a minor amount of non-aromatic hydrocarbons boiling in the same boiling range. The aromatic composition of the feed is 65% by weight meta-xylene, 14% by weight para-xylene, 12% by weight ethyl benzene and 7% by weight ortho-xylene. The flow of the aromatic content of the feed is 16,388 pounds per hour. This feed stream is passed through line 11 (from a source not shown) into a contacting zone 13, which suitably comprises an efficient continuous countercurrent contacting device such as a rotating disk contactor as shown (see U. S. Patent 2,601,674). The feed is passed into this zone at a point intermediate the ends whereby it is contacted with a downwardly flowing recycled solvent solution, entering zone 13 near the top through line 15 from a source to be described later. The solvent solution consists of 88,454 pounds per hour of HF, 34,586 pounds per hour of $PF_5$ together with about 1530 pounds per hour of normal butane and 1238 pounds per hour of meta-xylene. The reason for the presence of the latter two components is a matter of economics in the design of the recovery system, rather than a requirement of the contacting of the mixed aromatics with the solution. The portion of the feed which is not extracted (i. e., the raffinate) leaves zone 13 near the top through line 17. The aromatic content of this raffinate stream consists of 5661 pounds per hour of para-xylene, ortho-xylene and ethyl benzene and 88 pounds per hour of meta-xylene. This stream also contains all of the non-aromatics present in the feed and also small quantities of butane, HF and $PF_5$. This stream is preferably distilled to remove the latter three components in a raffinate purification system (not shown) in a manner which will be obvious to persons practiced in the art. The purified raffinate is then suitable for such uses as recovering the other aromatics present therein, blending into gasoline, recycling to a catalytic or thermal reforming process, or the like. A backwash stream, from a source to be described later, consisting of 2654 pounds per hour of meta-xylene and 30 pounds per hour of para-xylene, ortho-xylene and ethyl benzene, is introduced near the bottom of contacting zone 13 via line 19. This stream serves to enrich the extract phase in meta-xylene and at the same time to increase the recovery of the other aromatics in the raffinate stream in accordance with the well-known backward principle.

The extract phase, consisting of 14,342 pounds per hour of meta-xylene, 119 pounds per hour of para-xylene, ortho-xylene and ethyl benzene, 88,366 pounds per hour of HF and 33,613 pounds per hour of $PF_5$, leaves the bottom of contacting zone 13 through line 21 and is introduced directly into the top of contacting zone 23, which also suitably comprises an efficient continuous countercurrent contacting device such as a rotating disk contactor as shown. In contacting zone 23, the extract phase obtained in zone 13 flows downwardly in contact with upwardly flowing liquid normal butane, whereby the aromatic complex is decomposed and the aromatic content thereof is absorbed into the butane phase, the remaining phase consisting predominantly of solvent solution. The butane stream enters the bottom of zone 23, via line 25 from a source to be described later and consists of 36,911 pounds per hour of normal butane, 309 pounds per hour of HF and 10,880 pounds per hour of $PF_5$.

The separated solvent solution leaves zone 23 via line 15 and is returned to zone 13 for further contacting of incoming feed as previously described. The butane stream, now containing the major proportion of the aromatic content of the extract phase from contacting zone 13, leaves the top of contacting zone 23 via line 27 and consists of 13,104 pounds per hour of meta-xylene, 119 pounds per hour of para-xylene, ortho-xylene and ethyl benzene, 35,381 pounds per hour of normal butane, 221 pounds per hour of HF and 9907 pounds per hour of $PF_5$. This stream is then distilled in distillation zone 29, which is suitably a fractionating column as shown. The overhead product leaves distillation zone 29 via line 31 and consists of 35,381 pounds per hour of normal butane, 221 pounds per hour of HF and 9907 pounds per hour of $PF_5$. Into this stream is introduced, via line 33, any butane, HF and $PF_5$ obtained from a raffinate purification system, not shown, but such as mentioned above. In this example, the amounts recovered in the raffinate purification system are 1530 pounds per hour of butane, 88 pounds per hour of HF and 973 pounds per hour of $PF_5$. The total stream is then returned to contacting zone 23 via line 25 for further contacting of incoming extract phase from zone 13 as previously described.

The distillation residue leaves zone 29 via line 35 and consists of 13,104 pounds per hour of meta-xylene and 119 pounds per hour of para-xylene, ortho-xylene and ethyl benzene. This stream is split, the major part leaving the process as the meta-xylene product (99.1% by weight pure meta-xylene) and the remainder being returned as backwash via line 19 to zone 13 as previously described.

In this example the temperature and pressure employed in the contacting zones 13 and 23 are 0° C. and 16 atmospheres, although as will be apparent, considerable departures from these may be desirable depending upon economic considerations in any given case.

While in the above example, this butane-meta-xylene stream is transferred directly from contact zone 23 to distillation zone 29, it will be advantageous in many cases to include an intermediate stripping step for the removal of the HF and $PF_5$ from this stream. This avoids any possibility of chemical conversion during the somewhat higher temperatures in distillation zone 29 and reduces the overall heat requirements. In such a variation of the process the HF and $PF_5$ removed from the butane-meta-xylene stream can be readily absorbed, for example, in a separate absorption zone, by the butane stream returning to contact zone 23 via line 25.

Butane is the illustrated and preferred liquid decomplexing extractant medium for the recovery of the meta-disubstituted aromatic from the extract phase because it acts as a pressure pump in the process, in a manner which will be apparent to those skilled in the art, whereby it is not necessary to use high capacity compressors for the return of the very volatile phosphorus pentafluoride from the distillation step to the contacting steps. Other materials are suitable as the decomplexing medium as long as they are less basic than the meta-disubstituted benzene and miscible therewith, and, in the case of hydrocarbon fractions which may contain aromatics, have a boiling range not overlapping the boiling point of the meta-disubstituted benzene, for example, a heavy hydrocarbon such as a kerosene or mineral spirits raffinate obtained from an Edeleanu extraction process, or a light gasoline, or benzene, or toluene, or non-hydrocarbon solvents such as carbon disulfide, carbon tetrachloride, chloroform, and the like. A hydrocarbon decomplexing medium is generally preferred, especially one containing substantially no aromatics.

The drawing, for simplicity, does not show all of the auxiliary equipment such as pumps, compressors, pipes, valves, outlets, inlets, tanks, heating lines, cooling lines, heat exchangers, and the like, which may be found to be desirable for the most effective operation of the process as applied to a given case under a selected set of operating conditions, because the proper selection and placement of such equipment will be evident to one skilled in the art in view of the description of the invention.

I claim as my invention:

1. A process for the separation of a meta-dialkyl-substituted benzene hydrocarbon compound from an essentially sulfur-free hydrocarbon mixture containing said compound which comprises contacting said mixture with a solvent mixture comprising liquid hydrogen fluoride and phosphorus pentafluoride, separating an essentially hydrocarbon raffinate phase, and an extract phase containing hydrogen fluoride and phosphorus pentafluoride and being enriched in said meta-dialkyl-substituted benzene hydrocarbon compound and recovering said meta-dialkyl-substituted benzene hydrocarbon compound from said extract phase.

2. A process for the separation of a meta-dialkyl-substituted benzene hydrocarbon compound containing from 8 to 10 carbon atoms from an essentially sulfur-free hydrocarbon mixture containing said compound and at least one non-meta-substituted benzene hydrocarbon compound having a relatively similar boiling point, which comprises contacting said mixture with a solvent mixture comprising liquid hydrogen fluoride and phosphorus pentafluoride, separating an essentially hydrocarbon raffinate phase enriched in said non-meta-dialkyl-substituted benzene hydrocarbon compound and an extract phase containing hydrogen fluoride and phosphorus pentafluoride and being enriched in said meta-dialkyl-substituted benzene hydrocarbon compound and recovering said meta-dialkyl-substituted benzene hydrocarbon compound from said extract phase.

3. A process for the separation of meta-xylene from an essentially sulfur-free hydrocarbon mixture containing meta-xylene and at least one aromatic isomer thereof, which comprises contacting said mixture with a solvent mixture comprising liquid hydrogen fluoride and phosphorus pentafluoride, separating an essentially hydrocarbon raffinate phase enriched in said aromatic isomer and an extract phase containing hydrogen fluoride and phosphorus pentafluoride and being enriched in meta-xylene, and recovering meta-xylene from said extract phase.

4. A process in accordance with claim 3 wherein said hydrocarbon mixture consists essentially of meta-xylene and para-xylene.

5. A process for the separation of meta-xylene from an essentially sulfur-free hydrocarbon mixture of meta-xylene and at least one aromatic isomer thereof, which comprises contacting said mixture with a solvent mixture comprising liquid hydrogen fluoride and from about 0.5 to about 50 mol percent of phosphorus pentafluoride, at a temperature of from about −50° C. to about +50° C. and at a pressure of from about 1 to about 100 atmospheres, the weight ratio of said solvent mixture to said hydrocarbon mixture being from about 0.5:1 to about 100:1, separating an essentially hydrocarbon phase containing a predominant amount of said aromatic isomer and an extract phase containing hydrogen fluoride, phosphorus pentafluoride and a predominant amount of said meta-xylene, and recovering meta-xylene from said extract phase.

6. A process for the separation of meta-xylene from an essentially sulfur-free hydrocarbon mixture containing meta-xylene and at least one aromatic isomer thereof, which comprises continuously contacting countercurrently flowing streams of said mixture and a solvent mixture comprising liquid fluoride and phosphorus pentafluoride in a first contacting zone, separately removing from said first contacting zone an essentially hydrocarbon first raffinate phase containing a predominant amount of said aromatic isomer and a first extract phase containing hydrogen fluoride, phosphorus pentafluoride and a predominant amount of said meta-xylene, continuously and countercurrently contacting said first extract phase in a second contacting zone with a liquid hydrocarbon material having a normal boiling range different from the normal boiling point of meta-xylene, separately removing from said second contacting zone a second raffinate phase containing a predominant amount of the hydrogen fluoride and phosphorus pentafluoride contained in said first extract phase and a second extract phase consisting essentially of said liquid hydrocarbon material and meta-xylene, recycling said second raffinate phase as said solvent mixture to said first contacting zone, distilling said second extract phase to separate meta-xylene and said liquid hydrocarbon material, and recycling said liquid hydrocarbon material to said second contacting zone.

References Cited in the file of this patent
UNITED STATES PATENTS

| | | |
|---|---|---|
| 1,962,181 | Egloff | June 12, 1934 |
| 2,521,444 | Brooke et al. | Sept. 5, 1950 |